(12) United States Patent
Dudkowski

(10) Patent No.: US 6,816,205 B2
(45) Date of Patent: Nov. 9, 2004

(54) SYSTEM AND METHOD FOR CAMERA SELECTION TALLYING FOR MULTIPLE CAMERA VIDEO PRODUCTION

(76) Inventor: Edmond Louis Dudkowski, 3020 Bridgeway, #279, Sausalito, CA (US) 94965

(*) Notice: Subject to any disclaimer, the term of this patent is extended or adjusted under 35 U.S.C. 154(b) by 336 days.

(21) Appl. No.: 10/125,130

(22) Filed: Apr. 17, 2002

(65) Prior Publication Data

US 2002/0196329 A1 Dec. 26, 2002

Related U.S. Application Data

(60) Provisional application No. 60/285,277, filed on Apr. 20, 2001.

(51) Int. Cl.[7] .............................................. H04N 5/265
(52) U.S. Cl. ....................................... 348/705; 348/722
(58) Field of Search .............................. 348/211, 159, 348/212, 213, 705, 722

(56) References Cited

U.S. PATENT DOCUMENTS 4,539,595 A * 9/1985 Warner .................... 348/211.5
5,065,249 A    11/1991 Horn et al.
5,325,202 A    6/1994 Washino
5,335,014 A * 8/1994 Elberbaum .................. 348/159
5,345,592 A    9/1994 Woodmas
5,450,140 A    9/1995 Washino
5,854,654 A * 12/1998 Zwahlen et al. ............. 348/159

FOREIGN PATENT DOCUMENTS

JP    408237548 A * 9/1996
JP    200013649 A * 1/2000

* cited by examiner

Primary Examiner—David E. Harvey
(74) Attorney, Agent, or Firm—Coudert Brothers

(57) ABSTRACT

A method and system for visually signaling the selection of a specific television or video camera source during the live editing of multiple camera sources is disclosed. The system includes an adapter and a power console in combination for receiving a plurality of tally signals from a video switcher and converting each of the tally signals into an encoded sub-audible Continuous Tone Control Squelch System tone. The system also includes a tally system having a plurality of belt-pack assemblies for receiving the encoded sub-audible CTCSS tone and illuminating tally lights corresponding to the camera selected by the switcher.

27 Claims, 4 Drawing Sheets

SYSTEM AND METHOD FOR CAMERA SELECTION TALLYING FOR MULTIPLE CAMERA VIDEO PRODUCTION

This application claims the benefit of U.S. Provisional Application No. 60/285,277 filed Apr. 20, 2001.

FIELD OF THE INVENTION

This invention relates to multiple camera video production, and more specifically to a method and system for visually signaling the selection of a specific television or video camera source during the live editing of multiple camera sources.

BACKGROUND OF THE INVENTION

Traditional multiple camera video production systems include analog cameras connected to a video switcher via multiple conductor camera cable. This traditional production system includes an additional fundamental feature, the "tally light" system. The tally light system tells both the individual camera operators and any on-camera talent being photographed which camera is "on" or "live."

The signals for the tally light feature are sent from the switcher to the cameras down a separate electrical wire contained within the multiple conductor camera cables. The tally light information derived from these tally signals follows exactly the sequence of cameras selected by the person pressing the switch, which selects the "live" camera. The tally signals selectively activate lights in both the camera viewfinder for the camera operator to become aware of when their particular camera is selected and in front of the camera so that talent being photographed will know which camera has been selected and is photographing the scene at that very moment.

A new single screen live video editor was described in U.S. patent application Ser. No. 10/081,543, filed Feb. 20, 2002, entitled "PORTABLE SYSTEM FOR LIVE TELEVISION SIGNAL EDITING." by Edmond Louis Dudkowski. The video editor described in this patent application is a "plug and play" system that accepts both analog and digital video input signals from a plurality of single video camera shooting equipment ("camcorders"), both "prosumer" (professional level) and consumer. The system then allows a user to use a switcher to edit these input signals, and the system then enables each input signal, as well as a preview and a program signal, to be simultaneously viewed on a single display monitor.

Just as switchers in traditional multiple camera video production systems, the switcher in this new system generates tally signals. However, the traditional tally light system will not work when camcorders are used as the video input source. Specifically, when camcorders are used as an input source to this new live video editor, multiple conductor cable is unnecessary because only video signals are available from the cameras. The elimination of the multiple conductor camera cable between the camera and the switcher also eliminates the tally light system.

What is needed is a system for visually showing camera operators when their signal is "live" and for showing on-camera talent which camera is photographing them at any given moment, without the need for multiple conductor camera cable to be returned to the camera.

SUMMARY OF THE INVENTION

The present invention is directed at addressing the above-mentioned shortcomings, disadvantages and problems of the prior art. The present invention describes a system for camera selection tallying for multiple camera video production comprising: an adaptor for receiving a plurality of tally signals generated in a switcher, each said tally signal generated in response to a given camera being selected, said adaptor further configured for converting each said received tally signal into an encoded signal having data that identifies an address that corresponds to the selected camera; a tally system for decoding each said encoded signal to retrieve the address data and for displaying at least one visual indicator associated with said address data that identifies the corresponding camera that was selected; and a power console coupled between said adaptor and said tally system for coupling each said encoded signal from said adaptor to said tally system.

The adapter is further configured to convert each tally signal into a corresponding sub-audible CTCSS tone and further to encode the CTCSS tone with data that identifies a CTCSS code address that corresponds to the selected camera. The power console provides a power supply source and has at least two frequency channels, wherein at least one channel has an intercom line for two-way communication between a director and a plurality of camera operators. The power console provides power to the adapter and is configured to forward the encoded sub-audible CTCSS tone through the intercom line to each of a plurality of belt-packs in the tally system, each belt-pack being connected in parallel to the power console and each having a dipswitch for setting the belt-pack to a given CTCSS code address corresponding to a given camera. Each belt-pack is further configured to receive the encoded sub-audible CTCSS tone from the intercom line, separate the encoded data from the sub-audible CTCSS tone, compare the retrieved data to the belt-pack's CTCSS code (or "dipswitch") address, and illuminate a series of light emitting diodes ("LEDs") connected to the belt-pack if the retrieved data matches the CTCSS code address.

The present invention also describes a method for camera selection tallying for multiple camera video production comprising: (a) causing a tally signal to be received into an adaptor, said tally signal generated in response to a given camera being selected; (b) causing said tally signal to be converted by said adaptor into an encoded signal having data that identifies an address that corresponds to the selected camera; (c) causing said tally signal to be coupled from said adaptor to a tally system using a power console; (d) causing said encoded signal to be decoded to retrieve the address data; and (e) causing a visual indicator associated with said address data to be displayed for identifying the corresponding camera that was selected and repeating steps (a)–(e) until said video production has ceased.

The primary object of the present invention is to provide a tally light system without the need for multiple conductor cable. A key advantage of the present invention is that a tally light system can be utilized with a multiple camera video production system that uses prosumer and consumer camcorders, where a tally light system would not otherwise exist.

BRIEF DESCRIPTIONS OF THE DRAWINGS

The foregoing aspects and attendant advantages of the present invention will become more readily apparent by reference to the following detailed description, when taken in conjunction with the accompanying drawings, wherein.

DETAILED DESCRIPTION OF THE INVENTION

Figure 1:
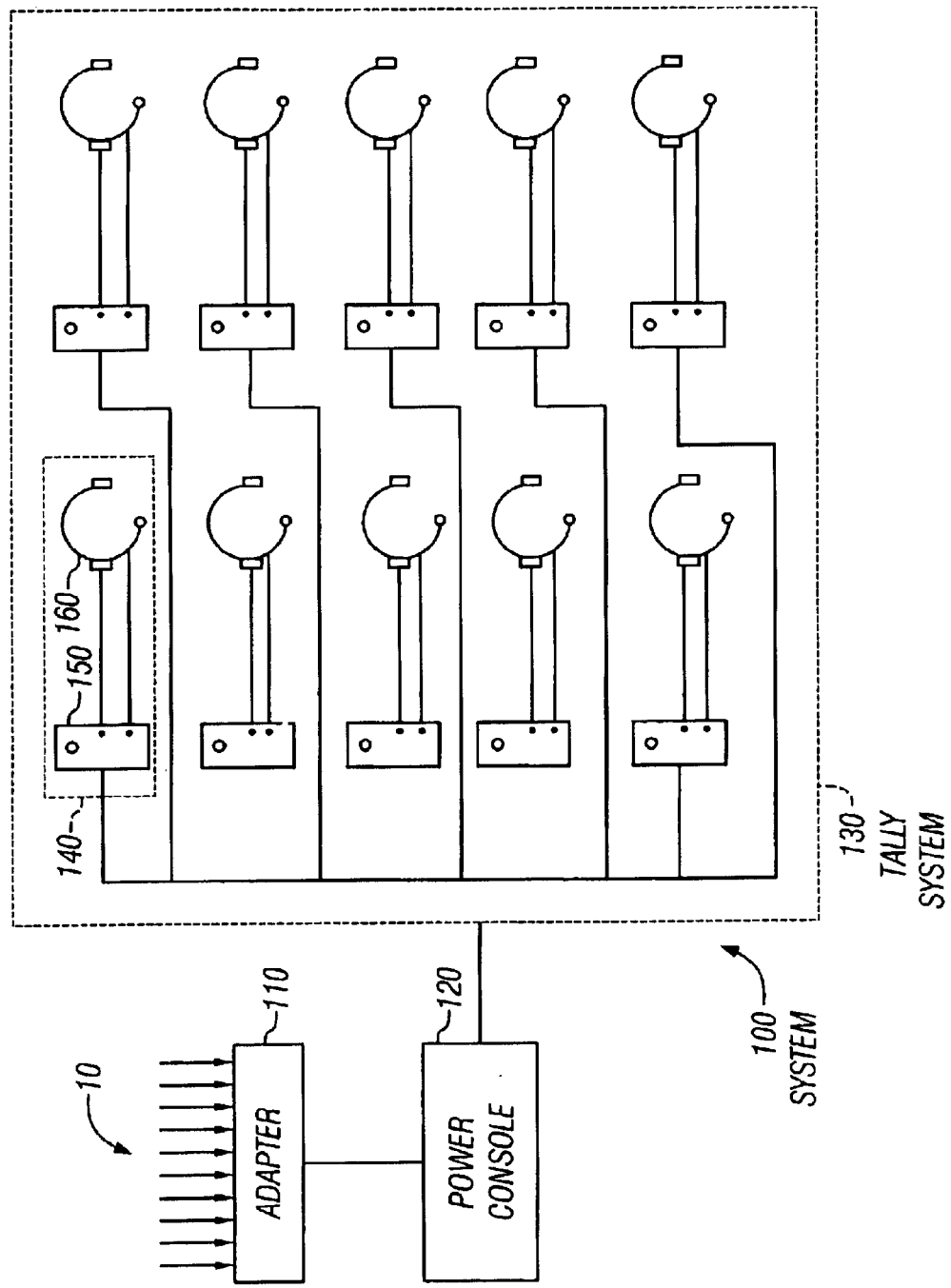
FIG. 1 is a block diagram of a system for camera selection tallying for multiple camera video production according to a preferred embodiment of the present invention.

FIG. 1 is a block diagram of a system for camera selection tallying for multiple camera video production according to a preferred embodiment of the present invention. System 100 preferably includes an Adapter 110, a Power Console 120, and a Tally System 130, which is comprised of a plurality of tally subsystems 140 that each include a Belt-Pack 150, which drives one or more LEDs (or "tally lights"), and a Headset 160.

Adapter 110 has a plurality of logic input leads to receive a plurality of tally signals 10 from a video switcher. Each tally signal is typically a voltage across a tally LED in the switcher, which is generated when a switcher operator selects a corresponding camera. Adapter 110 also has a micro-controller (microprocessor or converter circuit) that preferably converts each tally voltage signal into a Continuous Tone Control Squelch System (CTCSS) tone that is compatible with Power Console 120. The System Adapter PCA model SA100 manufactured by Smartsciences is one example of an adapter that could be used in a preferred embodiment of the present invention.

Power Console 120 is preferably connected to Adapter 110 via a personal computer board multiple pin edge connector such as a Panduit or similar connector. Power Console 120 is a conventional private-line (P-L) voice communication system power console preferably having at least two audio frequency channels, wherein at least one channel is configured for transmitting CTCSS tones on an intercom line dedicated to two-way communications between a director and a plurality of camera operators. For example, in live television production, the director uses the P-L system to give the camera operators voice audio instructions about movements such as zooming, panning, tilting and framing. Power Console 120 further supplies a direct current ("DC") power source to Adapter 110 and to each Belt-Pack 150.

During P-L communications, the CTCSS provides a way to differentiate each camera operator since all of the camera operators use a single frequency to communicate with the director. To enable each camera operator to be identified within the System 100, each camera operator has equipment that is assigned a different CTCSS code address which corresponds to a different sub-audible CTCSS tone. As set forth more fully below and as illustrated in FIGS. 2 & 3, the present invention uses the sub-audible CTCSS tones generated by Adapter 110 and forwarded through Power Console 120 to operate the tally lights within Tally System 130, in order to indicate which camera is live.

Referring again to FIG. 1, Tally System 130 consists of a plurality of tally subsystems 140 for P-L communications and for tally indication. Each subsystem 140 contains a Belt-Pack 150 that receives the sub-audible CTCSS tones from Power Console 120 coupled to a Headset 160. System 100 contains a minimum of one tally subsystem for each camera operator. Power Console 120 is preferably connected in parallel to each Belt-Pack 150 through an industry standard three-conductor audio (microphone) cable and corresponding connectors.

Figure 2:
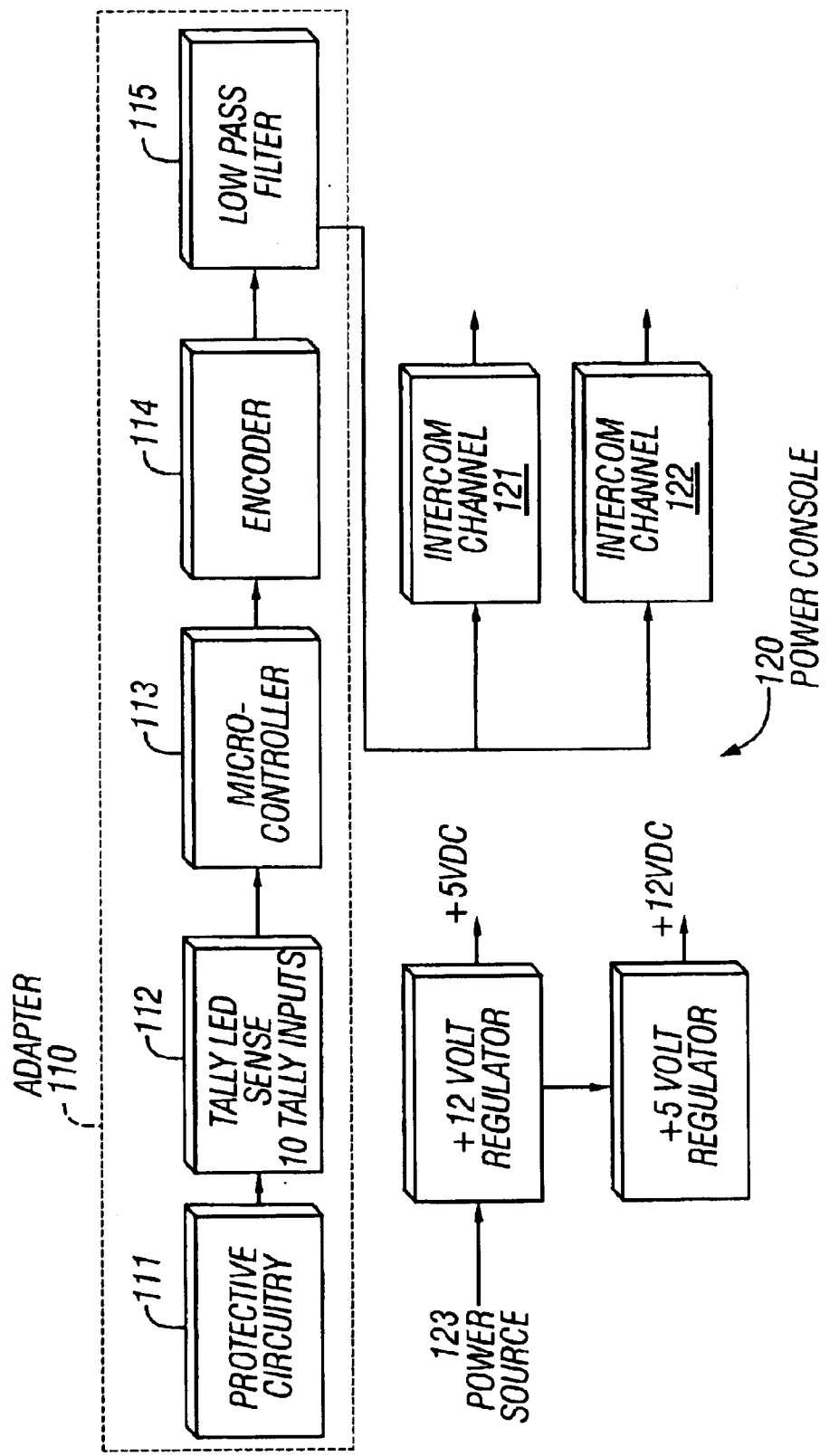
FIG. 2 is a block diagram illustrating the elements of Adapter 110 and Power Console 120, of System 100 illustrated in FIG. 1, which are used to accept a tally signal and output a corresponding encoded sub-audible CTCSS tone.
Figure 3:
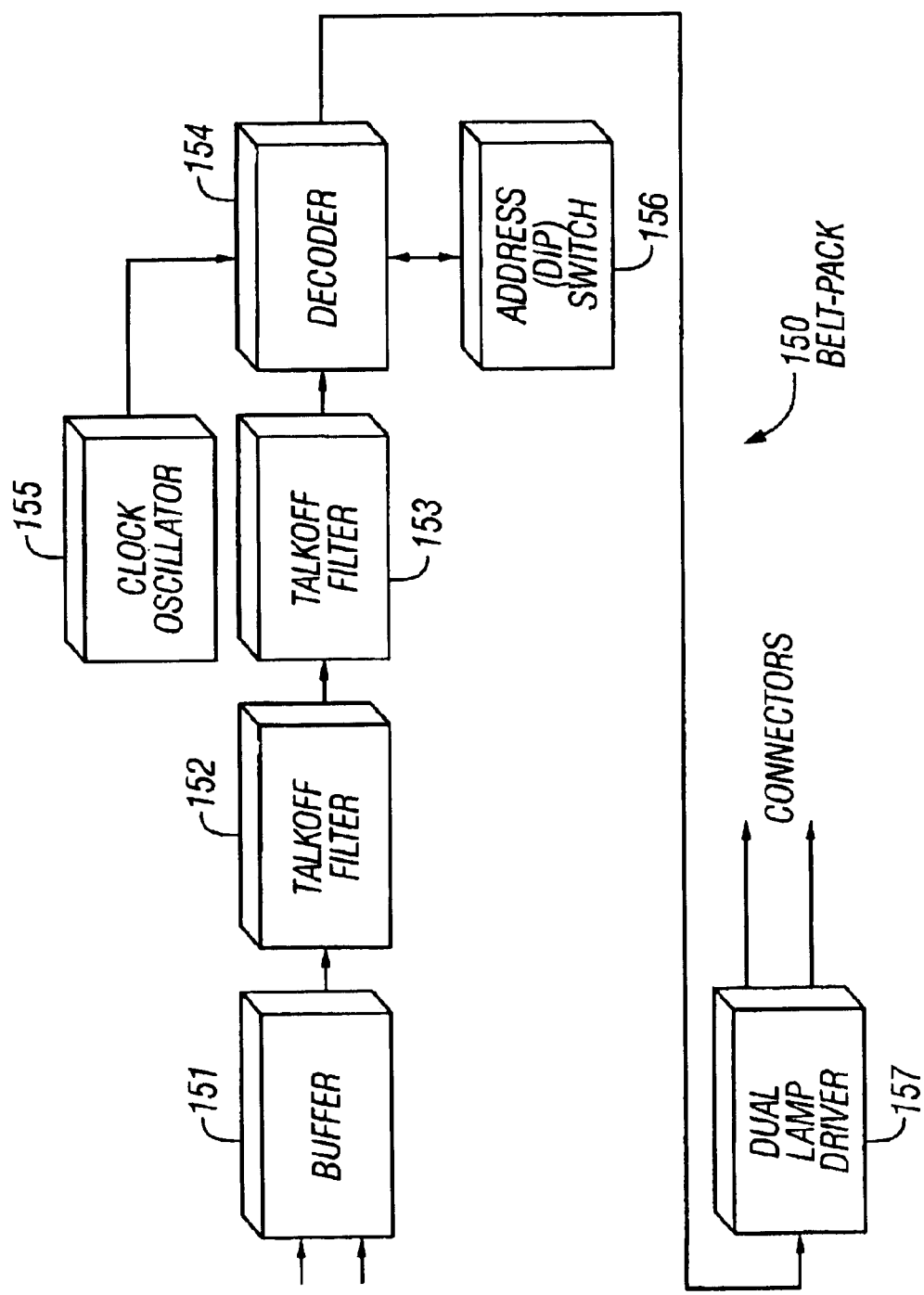
FIG. 3 is a block diagram illustrating the elements of a Belt Pack 150, of System 100 illustrated in FIG. 1, which is used to accept an encoded sub-audible CTCSS tone and activate one or more LEDs if the encoded data matches the CTCSS code address.

FIG. 2 is a block diagram illustrating the elements of Adapter 110 and Power Console 120, of System 100 illustrated in FIG. 1, which are used to accept a tally signal and output a corresponding encoded sub-audible CTCSS tone. The elements of Adapter 110 used to receive and convert the tally signals are shown in FIG. 2 within the dotted lines. These elements include Protective Circuitry 111, a Tally LED Sense circuit 112, a Microcontroller 113, an Encoder 114 and a Low Pass Filter 115. FIG. 2 also shows the elements of Power Console 120 used to route an encoded sub-audible CTCSS tone to Tally System 130. These elements include an Intercom Channel 121, an Intercom Channel 122 and a Power Source 123.

Adapter 110 is a printed circuit assembly ("PCA") that uses conventional Protective Circuitry 111 to shield the PCA while receiving a tally signal voltage. Tally LED Sense circuit 112 preferably comprises ten tally input leads for receiving each of a plurality of tally signals. Each tally input lead is coupled to a separate voltage output from the switcher, wherein each switcher output emits a tally signal voltage that corresponds to a particular camera being selected. More or fewer tally input leads can be used depending upon the number of cameras used to shoot an event or other production. Micro-controller 113 serves as the microprocessor and controller for Adapter 110. Micro-controller 113 converts the tally signal into a corresponding sub-audible CTCSS tone depending upon which input lead the voltage is received from. Encoder 114 then encodes the CTCSS tone, using conventional methods known in the art, with data which identifies a CTCSS code address corresponding to the camera selected. This encoded sub-audible CTCSS tone then passes through Low Pass Filter 115 for noise removal into either Intercom Channel 121 or Intercom Channel 122 to be forwarded to Tally System 130.

Intercom Channels 121 & 122 are preferably line drivers and accept both verbal information that has been converted by Power Console 120 into an audio signal and the encoded sub-audible CTCSS tone. Preferably a combined encoded sub-audible CTCSS tone and audio signal is sent by either Intercom Channel 121 or 122 down the three conductor microphone cable to each Belt-Pack 150 in Tally System 130. Power Console 120 also preferably comprises a Power Source 123 that supplies a 12 volt DC power source to Adapter 110 and a 5 volt DC power source to each Belt-Pack 150.

FIG. 3 is a block diagram illustrating the elements of a Belt Pack 150, of System 100 illustrated in FIG. 1, which is used to accept an encoded sub-audible CTCSS tone and activate one or more LEDs coupled to the Belt-Pack 150 if the encoded data matches the belt-pack's CTCSS code address. Each Belt-Pack 150 preferably includes a Buffer 151, Talk-off Filters 152 & 153, a Decoder 154 having a Clock Oscillator 155, an Address Dipswitch 156 and a Dual Lamp Driver 157.

The combined encoded sub-audible CTCSS tone and audio signal from either Intercom Channel 121 or 122 of Power Console 120 is received into Buffer 151, which is a conventional buffer stage. The combined signal then passes through Talk-off Filters 152 and 153 to separate the encoded sub-audible CTCSS tone from the audio signal. Decoder 154 receives the encoded sub-audible CTCSS tone and, with Clock Oscillator 155 and using conventional methods known in the art, demodulates the encoded sub-audible CTCSS tone to retrieve the encoded data.

Decoder 154 is preferably further configured to compare the retrieved CTCSS code address data with the setting of the six-position Address Dipswitch 156. Address Dipswitch 156 sets the CTCSS code address for Belt-Pack 150, which is used to identify the camera associated with that belt-pack. If the retrieved CTCSS code address data matches the dipswitch address, then Decoder 154 activates the Dual Lamp Driver 157 which illuminates one or more tally lights, each tally light being an LED connected to Belt-Pack 150. The illuminated tally lights indicate which camera was selected by the switcher and is, therefore the live camera.

Preferably an LED is connected via a cable to a jack at the rear of Belt-Pack 150, and this LED is mounted on a small box which may be attached by conventional means, such as Velcro, hoop, or loop fastener, to a surface on or near the camera. Another LED is preferably mounted on a small clip which may be clipped onto a microphone boom of Headset 160 so that the camera operator may see the illuminated LED through his or her peripheral vision while watching the camera viewfinder. Additional LEDs may be used and may be located in various locations to indicate to both on-camera talent and the camera operators which camera is live.

Belt-Pack 150 is also configured for conventional P-L communications. Therefore, Belt-Pack 150 further preferably includes a volume control for the user to adjust headset audio levels and also includes two switches. One switch is preferably used to turn the headset microphone on to speak, or off to reduce overall ambient noise in the system. The other switch is used to switch between Intercom Channels 121 and 122 of Power Console 120. If one channel is being used for a camera operator to communicate to the director, the other channel allows the other users on the P-L system to communicate with each other. Each Belt-Pack 150 also preferably includes: a rear panel having a connector for connecting to the intercom channels and power supply of Power Console 120; a headset connector; and jacks to connect the tally lights.

Figure 4:
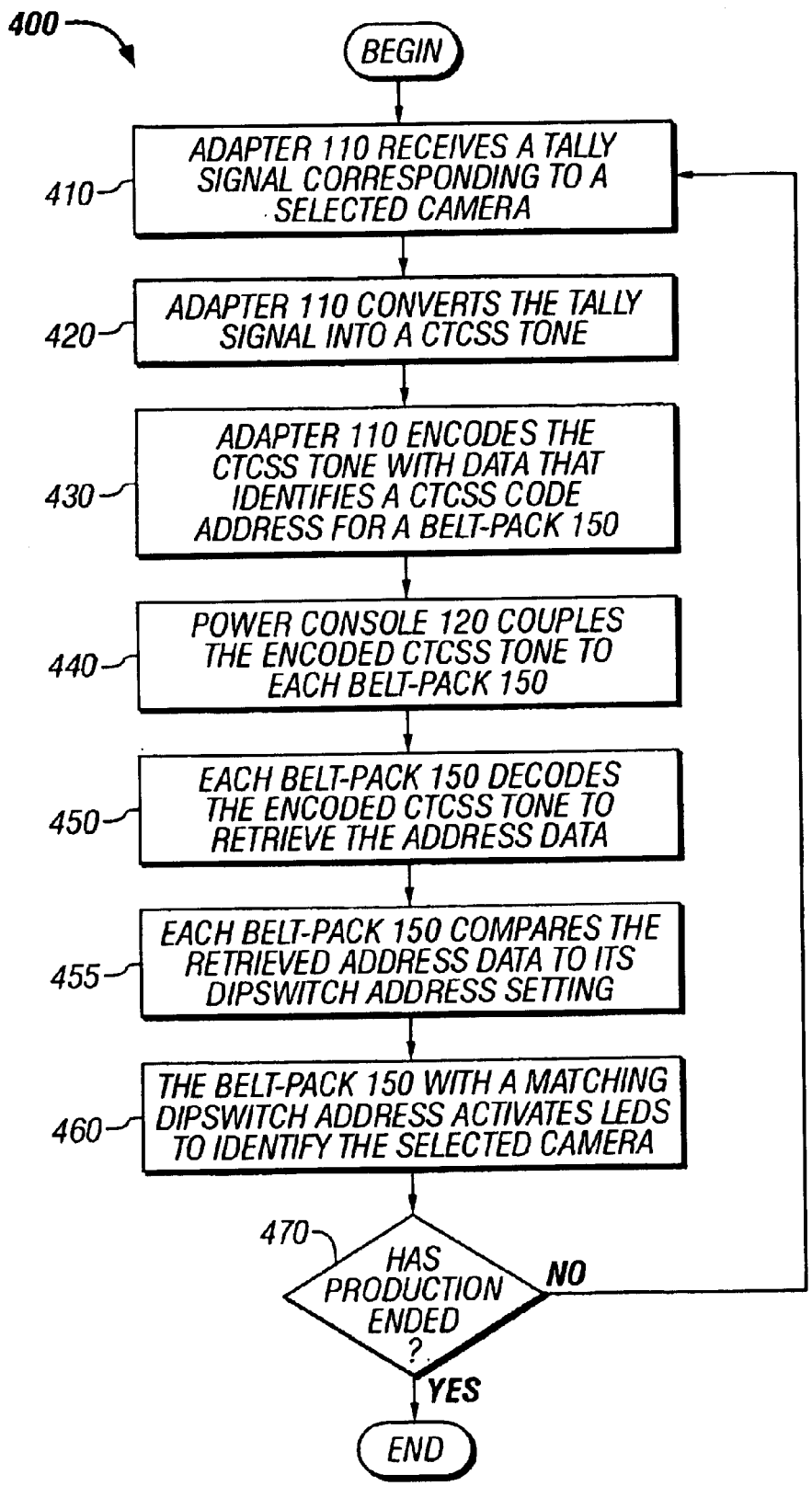
FIG. 4 is a flow diagram illustrating the steps for camera selection tallying for multiple camera video production performed by the preferred system illustrated in FIG. 1.

FIG. 4 is a flow diagram illustrating the steps for camera selection tallying for multiple camera video production performed by the preferred system illustrated in FIG. 1. Once video production of an event begins, a switcher operator selects a given "live" camera from a plurality of cameras taping the event. As this occurs, the switcher simultaneously produces a voltage across an LED, the "tally signal." At step 410, Adapter 110 receives a tally signal into one of its logic input terminals, and at step 420, the micro-controller of Adapter 110 converts this tally signal into one of a plurality of sub-audible CTCSS tones depending upon which camera was selected. Adapter 110 then encodes the sub-audible CTCSS tone with data that identifies a CTCSS code address corresponding to the camera selected, at step 430. This CTCSS code address also corresponds to the dipswitch setting of a Belt-Pack 150 in a given tally subsystem 140. The dipswitch for each Belt-Pack 150 in Tally System 130 is previously set to a different CTCSS code address corresponding to a different sub-audible CTCSS tone, to identify each individual camera operator.

Power Console 120 receives the encoded sub-audible CTCSS tone and couples it through an intercom line to each Belt-Pack 150, at step 440. Each Belt-Pack 150 receives the encoded sub-audible CTCSS tone, and the decoder of each Belt-Pack 150 separates the encoded data from the sub-audible CTCSS tone, at step 450. The decoder then compares the data retrieved with its dipswitch address, at step 455. At step 460, the Belt-pack 150 having a dipswitch address that matches the retrieved address data activates its LEDs. If it is determined at step 470 that video production has ended, then Process 400 ends. Otherwise, Process 400 repeats beginning with step 410.

In another embodiment of the present invention, each belt-pack receives the encoded sub-audible CTCSS tone without the use of a three connector microphone cable. In this embodiment, the power console is configured to transmit the encoded sub-audible CTCSS tone as a wireless radio frequency, and the belt-pack is configured to receive the encoded sub-audible CTCSS tone as a wireless radio frequency. This wireless embodiment of the current invention functions similarly in all other respects as the preferred embodiment described above.

The implementation examples of a method and system for camera selection tallying for multiple camera video production were chosen as being illustrative of the best mode of the present invention. All embodiments of the present invention described above are illustrative of the principles of the invention and are not intended to limit the invention to the particular embodiment described. Accordingly, while the preferred embodiment of the present invention has been illustrated and described, it will be appreciated that various changes can be made therein without departing from the spirit and scope of the invention.

What is claimed is:

1. A system for camera selection tallying for multiple camera video production comprising:

an adaptor for receiving a plurality of tally signals generated in a switcher, each said tally signal generated in response to a given camera being selected, said adaptor further configured for converting each said received tally signal into an encoded signal having data that identifies an address that corresponds to the selected camera;

a tally system for decoding each said encoded signal to retrieve the address data and for displaying at least one visual indicator associated with said address data that identifies the corresponding camera that was selected; and a power console coupled between said adaptor and said tally system for coupling each said encoded signal from said adaptor to said tally system.

2. The system of claim 1, said adaptor comprising:

a tally sense circuit comprising a plurality of tally input leads for receiving said plurality of tally signals;

a micro-controller coupled to said tally sense circuit for converting each said received tally signal into a Continuous Tone Control Squelch System "CTCSS" tone; and and an encoder coupled to said micro-controller for encoding each said CTCSS tone with data that identifies a CTCSS code address that corresponds to the selected camera.

3. The system of claim 2, said adaptor further comprising a protective circuit coupled to said tally sense circuit for shielding said adaptor as it receives each said tally signal and a low pass filter coupled to said encoder for removing noise from each said encoded signal.

4. The system of claim 2, wherein said adaptor is a printed circuit assembly.

5. The system of claim 1, wherein said power console is a private-line voice communication system comprising at least two audio frequency channels and at least one said audio frequency channel is configured for transmitting a Continuous Tone Control Squelch System tone on an intercom line.

6. The system of claim 5, said power console further comprising a power source for providing power to said adaptor and to said tally system.

7. The system of claim 5, wherein each said audio frequency channel is an intercom channel.

8. The system of claim 7, wherein each said intercom channel is a line driver for coupling to said tally system a combined signal comprising an encoded signal and a respective audio signal having verbal information.

9. The system of claim 1, said tally system comprising a plurality of tally subsystems coupled in parallel, wherein each said tally subsystem is associated with a different camera.

10. The system of claim 9, each said tally subsystem comprising a belt-pack coupled to a headset, each said tally subsystem further comprising said at least one visual indicator.

11. The system of claim 10, said belt-pack comprising:
an address dipswitch for setting a dipswitch address for said belt-pack for identifying the camera associated with said belt-pack; and
a decoder coupled to said dipswitch for demodulating said encoded signal to retrieve said address data and for comparing said address data to said dipswitch address setting, such that if said retrieved data matches said dipswitch address, said decoder activates said at least one visual indicator.

12. The system of claim 10, wherein each said visual indicator is a light emitting diode (LED).

13. The system of claim 12, each said tally subsystem comprising at least two LEDs, wherein one said LED is connected via a jack at the rear of said belt-pack and mounted on or near the associated camera, and another said LED is mounted on a microphone boom of said headset.

14. The system of claim 11, said belt-pack further comprising a dual lamp driver coupled between said decoder and said at least one visual indicator for illuminating said at least one visual indicator in response to a prompting from said decoder.

15. The system of claim 11, said belt-pack further configured for private-line communications for receiving a plurality of audio signals having verbal information.

16. The system of claim 15, said belt-pack further comprising: a buffer and a first and second talk-off filter coupled between said buffer and said decoder for separating said encoded signals from said audio signals.

17. The system of claim 11, said belt-pack further comprising a rear panel having a plurality of connectors comprising at least one connector to said power console, at least one headset connector and at least one connector to each said visual indicator, said belt-pack further comprising a volume control to adjust an audio level of said headset.

18. A system for camera selection tallying for multiple camera video production comprising:
an adaptor comprising a tally sense circuit, a micro-controller and an encoder for receiving a plurality of tally signals generated in a switcher, each said tally signal generated in response to a given camera being selected, said adaptor further configured for converting each said received tally signal into an encoded signal having data that identifies an address that corresponds to the selected camera;
a tally system comprising a plurality of tally subsystems, each said tally subsystem comprising a belt-pack coupled to a headset and at least one visual indicator, said tally system for decoding each said encoded signal to retrieve the address data and for displaying said at least one visual indicator associated with said address data that identifies the corresponding camera that was selected; and
a power console coupled between said adaptor and said tally system for coupling each said encoded signal from said adaptor to said tally system.

19. A system for camera selection tallying for multiple camera video production comprising:
an adaptor for receiving a plurality of tally signals generated in a switcher, each said tally signal generated in response to a given camera being selected, said adaptor comprising a tally sense circuit comprising a plurality of tally input leads for receiving said plurality of tally signals, a micro-controller coupled to said tally sense circuit for converting each said received tally signal into a Continuous Tone Control Squelch System "CTCSS" tone, and and an encoder coupled to said micro-controller for encoding each said CTCSS tone with data that identifies a CTCSS code address that corresponds to the selected camera;
a tally system coupled to said adaptor, said tally system comprising a plurality of tally subsystems coupled in parallel, wherein each said tally subsystem is associated with a different camera, each said tally subsystem comprising a belt-pack coupled to a headset, each said tally subsystem further comprising at least one visual indicator, each said belt-pack comprising an address dipswitch for setting a dipswitch address for said belt-pack for identifying the camera associated with said belt-pack and a decoder coupled to said dipswitch for demodulating said encoded CTCSS tone to retrieve said address data and for comparing said address data to said dipswitch address setting, such that if said retrieved data matches said dipswitch address, said decoder activates said at least one visual indicator; and
a power console coupled between said adaptor and said tally system for coupling each said encoded signal from said adaptor to said tally system, wherein said power console is a private-line voice communication system comprising at least two audio frequency channels and at least one said audio frequency channel is configured for transmitting a Continuous Tone Control Squelch System tone on an intercom line, said power console further comprising a power source for providing power to said adaptor and to said tally system.

20. A method for camera selection tallying for multiple camera video production comprising:
(a) causing a tally signal to be received into an adaptor, said tally signal generated in response to a given camera being selected;
(b) causing said tally signal to be converted by said adaptor into an encoded signal having data that identifies an address that corresponds to the selected camera;
(c) causing said tally signal to be coupled from said adaptor to a tally system using a power console;
(d) causing said encoded signal to be decoded by said tally system to retrieve the address data; and
(e) causing a visual indicator associated with said address data to be displayed for identifying the corresponding camera that was selected and repeating steps (a)–(e) until said video production has ceased.

21. The method of claim 20, wherein said encoded signal is an encoded Continuous Tone Control Squelch System tone.

22. The method of claim 20, further comprising causing said encoded signal to be combined with an audio signal having verbal information by said power console before being coupled to said tally system.

23. The method of claim 20, wherein each said encoded signal is coupled to said tally system via a three-connector microphone cable.

24. The method of claim 20, wherein each said encoded signal is coupled to said tally system as a wireless radio frequency.

25. The method of claim 20 further comprising a step between steps (d) and (e) of causing said retrieved address data to be compared to a dipswitch setting for each of a plurality of belt-packs included in said tally system, each said dipswitch setting for setting an address that identifies a camera associated with the belt-pack, wherein a visual indicator coupled to said belt-pack having a dipswitch setting that matches the retrieved address data is displayed.

26. A method for camera selection tallying for multiple camera video production comprising:

(a) causing a tally signal to be received into an adaptor, said tally signal generated in response to a given camera being selected;

(b) causing said tally signal to be converted by said adaptor into an encoded signal having data that identifies an address that corresponds to the selected camera;

(c) causing said tally signal to be coupled from said adaptor to a tally system using a power console;

(d) causing said encoded signal to be decoded to retrieve the address data;

(e) causing said retrieved address data to be compared to a dipswitch setting for each of a plurality of belt-packs included in said tally system, each said dipswitch setting for setting an address that identifies a camera associated with the belt-pack; and (f) causing a visual indicator coupled to said belt-pack having a dipswitch setting that matches the retrieved address data to be displayed for identifying the corresponding camera that was selected and repeating steps (a)–(f) until said video production has ceased.

27. A method for camera selection tallying for multiple camera video production comprising:

(a) causing a tally signal to be received into an adaptor, said tally signal generated in response to a given camera being selected;

(b) causing said tally signal to be converted by said adaptor into an encoded Continuous Tone Control Squelch System (CTCSS) tone having data that identifies an address that corresponds to the selected camera;

(c) causing said tally signal to be coupled from said adaptor to a tally system using a power console;

(d) causing said encoded signal to be decoded to retrieve the address data;

(e) causing said retrieved address data to be compared to a dipswitch setting for each of a plurality of belt-packs included in said tally system, each said dipswitch setting for setting a CTCSS code address that identifies a camera associated with the belt-pack; and (f) causing a visual indicator coupled to said belt-pack having a CTCSS code address that matches the retrieved address data to be displayed for identifying the corresponding camera that was selected and repeating steps (a)–(f) until said video production has ceased.

* * * * *